(12) United States Patent
Bae et al.

(10) Patent No.: US 8,706,347 B2
(45) Date of Patent: Apr. 22, 2014

(54) DIAGNOSIS OF WHEEL ALIGNMENT USING GPS

(75) Inventors: Hong S. Bae, Sterling Heights, MI (US); Jihan Ryu, Apex, NC (US)

(73) Assignee: GM Global Technology Operations LLC, Detroit, MI (US)

( * ) Notice: Subject to any disclaimer, the term of this patent is extended or adjusted under 35 U.S.C. 154(b) by 1130 days.

(21) Appl. No.: 12/689,678

(22) Filed: Jan. 19, 2010

(65) Prior Publication Data
US 2011/0178671 A1 Jul. 21, 2011

(51) Int. Cl.
G06F 7/00 (2006.01)
G01B 21/26 (2006.01)

(52) U.S. Cl.
CPC ........................... G01B 21/26 (2013.01)
USPC ........................ 701/31.4; 701/30.5

(58) Field of Classification Search
USPC ........ 701/31.4, 30.5, 34.4; 700/279; 356/155; 33/203, 203.18; 702/150, 94; 342/357.35
See application file for complete search history.

(56) References Cited

U.S. PATENT DOCUMENTS

| | | | |
|---|---|---|---|
| 6,098,296 A | 8/2000 | Perisho, Jr. et al. | |
| 6,275,753 B1* | 8/2001 | Kyrtsos | 701/36 |
| 7,321,825 B2 | 1/2008 | Ranalli | |
| 2002/0189114 A1* | 12/2002 | Voeller et al. | 33/203.18 |
| 2004/0225423 A1 | 11/2004 | Carlson et al. | |
| 2005/0102073 A1 | 5/2005 | Ingram, II | |
| 2007/0112469 A1* | 5/2007 | Hara | 700/279 |
| 2007/0136078 A1 | 6/2007 | Plante | |
| 2009/0056152 A1* | 3/2009 | Rogers | 33/203.18 |
| 2009/0106990 A1* | 4/2009 | Harrill et al. | 33/288 |

* cited by examiner

*Primary Examiner* — Marthe Marc-Coleman

(57) ABSTRACT

A method to monitor alignment of wheels of a vehicle through analysis of a GPS signal includes monitoring the GPS signal, determining an actual trajectory of the vehicle based upon the GPS signal, monitoring a vehicle sensor indicating an expected change in vehicle heading, determining an expected trajectory of the vehicle based upon the vehicle sensor, and indicating misalignment of the wheels of the vehicle based upon a comparison of the trajectories.

18 Claims, 2 Drawing Sheets

DIAGNOSIS OF WHEEL ALIGNMENT USING GPS

TECHNICAL FIELD

This disclosure is related to vehicle operation and monitoring wheel alignment of a vehicle.

BACKGROUND

The statements in this section merely provide background information related to the present disclosure and may not constitute prior art.

Vehicle wheel alignment includes parameters corresponding to wheel angles relative to the vehicle, other wheels on the vehicle and, a ground surface. Known wheel alignment parameters include toe-in, camber, caster, and others. Misaligned wheels and tires can add stress to suspension components and tires, leading to irregular and premature tire wear and reduced service life for the suspension components.

Known vehicle systems actively control elements of chassis and suspension systems during vehicle operation, including steering, ride stiffness, load management, and others. Known active chassis and suspension systems rely upon accurate wheel alignment for effective operation.

Known global positioning system (GPS) signals and other global navigation satellite system (GNSS) signals can provide accurate positioning and navigation information for a wheeled vehicle. Automotive-grade inertial sensors, such as yaw-rate sensors and accelerometers, may have highly variable bias and scale characteristics that cause sensor drift that typically makes them un-suitable for navigation and heading determination functions without proper error correction techniques. For example, known automotive-grade yaw-rate sensors allow up to 2 deg/sec variations for the yaw-rate sensor bias.

SUMMARY

A method to monitor alignment of wheels of a vehicle through analysis of a GPS signal includes monitoring the GPS signal, determining an actual trajectory of the vehicle based upon the GPS signal, monitoring a vehicle sensor indicating an expected change in vehicle heading, determining an expected trajectory of the vehicle based upon the vehicle sensor, and indicating misalignment of the wheels of the vehicle based upon a comparison of the trajectories.

BRIEF DESCRIPTION OF THE DRAWINGS

One or more embodiments will now be described, by way of example, with reference to the accompanying drawings, in which.

DETAILED DESCRIPTION

Figure 1:
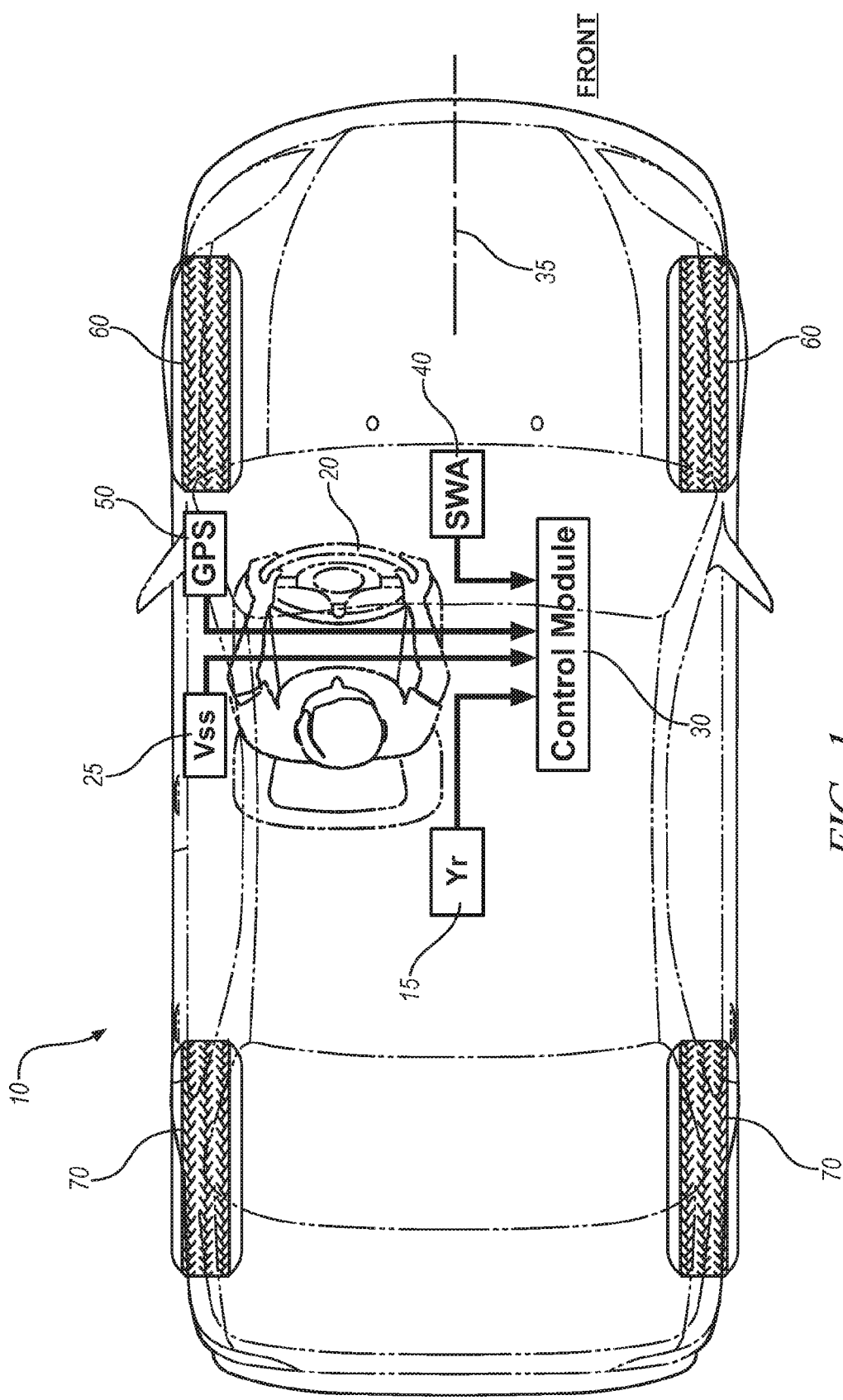
FIG. 1 is a plan view schematic diagram of a wheeled vehicle, in accordance with the present disclosure.

Referring now to the drawings, wherein the showings are for the purpose of illustrating certain exemplary embodiments only and not for the purpose of limiting the same, FIG. 1 schematically illustrates a wheeled ground vehicle 10 including a four-wheel passenger vehicle in one embodiment.

The vehicle 10 includes two front wheels 60 and two rear wheels 70. In one embodiment, the front wheels 60 are steerable relative to a longitudinal axis 35 of the vehicle 10 to provide steering capability and the rear wheels 70 are fixed relative to the longitudinal axis 35 of the vehicle 10, although the concepts described herein can be applied to a four-wheel steer vehicle and a rear-wheel steer vehicle. The vehicle 10 is equipped with a steering wheel 20 through which an operator controls the direction of the vehicle 10 by controlling the direction of the steerable front wheels 60. The steering wheel 20 is equipped with a steering wheel angle (SWA) sensor 40 to monitor operator input including a steering command. The vehicle 10 can be equipped with other sensors, including a vehicle speed (Vss) sensor 25 and a yaw rate sensor (Yr) 15. The vehicle 10 is further equipped with a position and navigational system referred to as a global positioning system (GPS) 50. The GPS 50 includes an extra-vehicle communications system and generates positioning and navigation information for the vehicle 10. The steering wheel angle sensor 40, the vehicle speed sensor 25, the yaw rate sensor 15 and the GPS 50 are signally connected to a control module 30.

For the purposes of this disclosure, three methods to determine a trajectory, heading, or yaw rate are described. An actual trajectory, heading, or yaw rate can be determined according to resulting vehicle position data as described by GPS data. An expected trajectory, heading, or yaw rate can be described according to vehicle sensors, for example, as described by a commanded steering angle (and a vehicle speed, as necessary). A measured trajectory, heading, or yaw rate can be described according to an signal output of a yaw rate sensor. The measured trajectory can be utilized as an actual trajectory if the error of the signal output is determined to be below a threshold. Yaw rate sensors are gyroscopic devices known in the art. Exemplary yaw rate sensors include piezoelectric type sensors and micromechanical type sensors.

Methods to employ GPS signals in automotive applications are known in the art. A known exemplary process utilizing GPS, disclosed in co-pending U.S. patent application Ser. No. 11/770,898 and incorporated herein by reference, permits use of GPS signals for vehicle applications including calibration of yaw-rate sensor signals.

The control module 30 is illustrated as a single element for ease of description. It should be recognized that the functions performed by the control module 30 may be combined in one or more devices. The control module 30 may take any suitable form including various combinations of one or more Application Specific Integrated Circuit(s) (ASIC), electronic circuit(s), central processing unit(s) (preferably microprocessor (s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Vehicles are configured such that wheels on the vehicle are nominally pointed directly forward, aligned with the longitudinal axis of the vehicle, when the steering wheel is in the center position. As described above, the steering system is equipped with a steering wheel angle sensor 40 which is configured to describe a commanded steering angle as compared to the center position. The commanded steering angle controls the orientation of the wheels of the vehicle. The relationship of the orientation of the wheels of the vehicle to the commanded steering angle is described as the alignment of the wheels. Factors affecting alignment or causing wheels to misalign are known in the art. Wheels that have an alignment error compared to the commanded steering angle by more than a threshold are said to be misaligned. Methods are known in the art to situate a vehicle in an external device that measures the alignment of the wheels with respect to the longitudinal axis of the car. Such an external device applies a measurement standard to the alignment of the wheels whereby misalignment can be diagnosed.

One having skill in the art will appreciate that GPS signals can be used to track the movement of a vehicle. It is known that GPS signals include an error, misplacing the location of the vehicle by some considerable distance. However, it is also known that GPS error tends to be constant for a geographic region, with all of the GPS signals describing positions for the vehicle with substantially identical GPS errors or offsets. One can say that the GPS signals include poor accuracy but high precision. By examining iterative samples of GPS data, a trajectory or a path traversed by the vehicle for the vehicle can be determined.

An actual trajectory of a vehicle determined by GPS device is utilized to analyze an expected trajectory of the vehicle based upon a vehicle sensor or sensors to evaluate alignment of the wheels of the vehicle. The expected trajectory can include a path expected to be followed by the vehicle as estimated by vehicle sensors, for example, describing measured vehicle speed and yaw rate. An exemplary expected trajectory is based upon a vehicle sensor describing an expected change in vehicle heading. Trajectories can be compared by any measure sufficient to compare deviation or error between the points defined within both the trajectories. In some exemplary embodiments, the actual trajectory and the expected trajectory can be expressed as an actual yaw rate and an expected yaw rate, respectively. The comparison of yaw rates can be instantaneous comparisons of yaw rates, for example, at a point whereat a set of test criteria have been met. In another example, yaw rate comparisons can be based upon average values through a sample period wherein a set of test criteria have been met. A number of methods to evaluate actual and expected trajectories of the vehicle are envisioned, and the disclosure is not intended to be limited to the particular exemplary embodiments described herein.

Actual yaw rate can be determined through analysis of the GPS data according to a number of methods known in the art. For example, a first heading can be established according two sampled positions, a first point and a second point, a second heading can established according to the second point and a third point, and a yaw rate can be determined based upon the difference of the first and second headings divided by the time period between the sampling of the second and third points. Another exemplary method would repeat the above calculation through a number of points and yield an average yaw rate through the sampling period. Other methods are known to evaluate GPS data to determine a yaw rate, and the disclosure is not intended to be limited to the particular exemplary embodiments described herein.

Expected yaw rate can be determined through analysis of vehicle sensors according to a number of known methods. For example, steering wheel angle sensor 40 can be used to predict an arc of travel for the vehicle based upon the turning of the wheels, and the vehicle speed sensor 25 can be used to estimate progress of the vehicle through the predicted arc of travel. Additional factors can affect the expected yaw rate, and exemplary factors are addressed below in relation to Equation 1. The expected yaw rate can be determined in one exemplary method according to changes in heading of the vehicle as defined by tangents to the arc.

Figure 2:
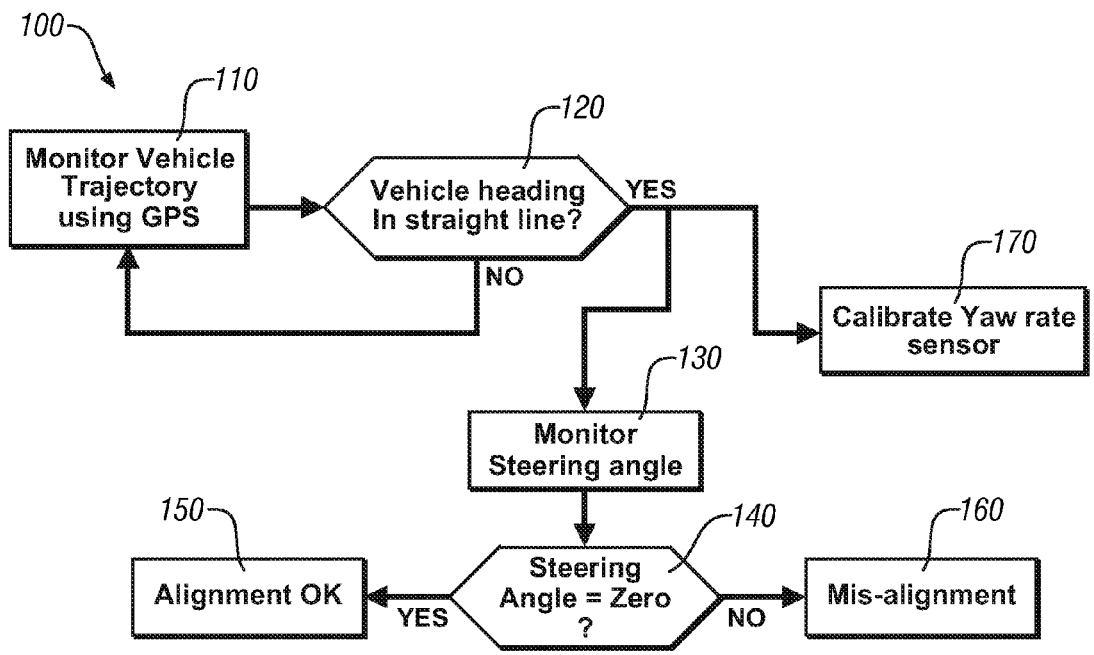
FIGS. 2 and 3 are algorithmic flowcharts, in accordance with the present disclosure.

One method to analyze the alignment of the wheels of the vehicle is based upon analyzing a vehicle traveling in a straight forward direction, in a straight forward trajectory, or an actual trajectory in a straight line coincident with the longitudinal axis of the vehicle. When an actual trajectory describes the vehicle traveling in a straight line, the commanded steering angle should indicate the wheels to be in alignment with the longitudinal axis of the vehicle corresponding to an expected trajectory in a straight line. Any error between the commanded steering angle and the longitudinal axis can be described as an alignment error. FIG. 2 shows a first flowchart (100) describing operations preferably executed in the control module 30 to monitor alignment of the wheels 60, 70 of the vehicle 10 described with reference to FIG. 1. During ongoing vehicle operation, an actual trajectory of the vehicle 10, i.e., vehicle speed and direction of travel, is monitored using the GPS 50. The control module 30 executes code to monitor the actual trajectory including direction of travel of the vehicle using information from the GPS 50 (110) and determines whether the heading of the vehicle 10 includes the vehicle 10 traveling in a straight line (120). Coincidentally the operator input to the steering wheel 20 as indicated by the steering wheel angle sensor 40 is monitored to determine the commanded steering angle (130). When the vehicle 10 is traveling in a straight line, the expected commanded steering angle is zero degrees, with some level of allowable error to account for variability introduced through the steering wheel angle sensor 40 and related signal processing (140). When the expected commanded steering angle is zero degrees, it is determined that the wheel alignment of the steerable wheels 60 is acceptable (150). When the expected commanded steering angle is varies from zero degrees by an amount greater than a predetermined threshold, it is determined that the wheel alignment of the steerable wheels 60 is not acceptable, and a misalignment of the vehicle wheels 60 and 70 can be identified (160).

When it is determined that the vehicle 10 is traveling in a straight line, this operation can optionally be used to calibrate a zero bias for the yaw rate sensor 15 (170). Specifically, when the vehicle 10 is traveling in a straight line according to the actual trajectory, the actual yaw rate of the vehicle 10 is zero, and the signal output from the yaw rate sensor 15 should correspond to a zero yaw rate. The control module 30 can monitor the signal output of the yaw rate sensor 15, a measured yaw rate. Any signal output from the yaw rate sensor 15 that is greater or less than an actual zero yaw rate determined by the GPS signal can be captured as the zero bias for the yaw rate sensor 15 and preferably stored in one of the memory devices of the control module 30 for use in conditioning and processing the signal output from the yaw rate sensor 15. Signal output from the yaw rate sensor 15 that is greater or less than the actual zero yaw rate, i.e., the zero bias for the yaw rate sensor, may result from misplacement of the yaw rate sensor 15 during vehicle assembly, misplacement of the yaw rate sensor 15 during vehicle servicing, electrical signal processing and sensor drift and zeroing errors, and other factors.

It will be appreciated that enabling the above method when the vehicle is traveling in a straight line tends to reduce impact of distorting factors upon the alignment measurement. For example, a vehicle going through a turn experiences lateral G forces which can in turn cause relative motion between the wheels of the vehicle and the road. Additionally, it will be appreciated that wheels of a vehicle traveling around a turn spin at different rates, and the effects of this relative motion, for example, when combined with the application of torque by the vehicle powertrain can cause further relative motion between the wheels and the road. Such relative motion can frequently be diagnosed and potentially factored by the control module, for example, based upon wheel speed measurements through an anti-lock braking system, but performing the methods herein while the vehicle is traveling in a forward trajectory reduces the effects of these factors. However, it will also be appreciated that reducing the opportunity for operating the methods herein to only when a vehicle is traveling in a threshold forward trajectory can reduce the opportunity to operate the methods.

Figure 3:
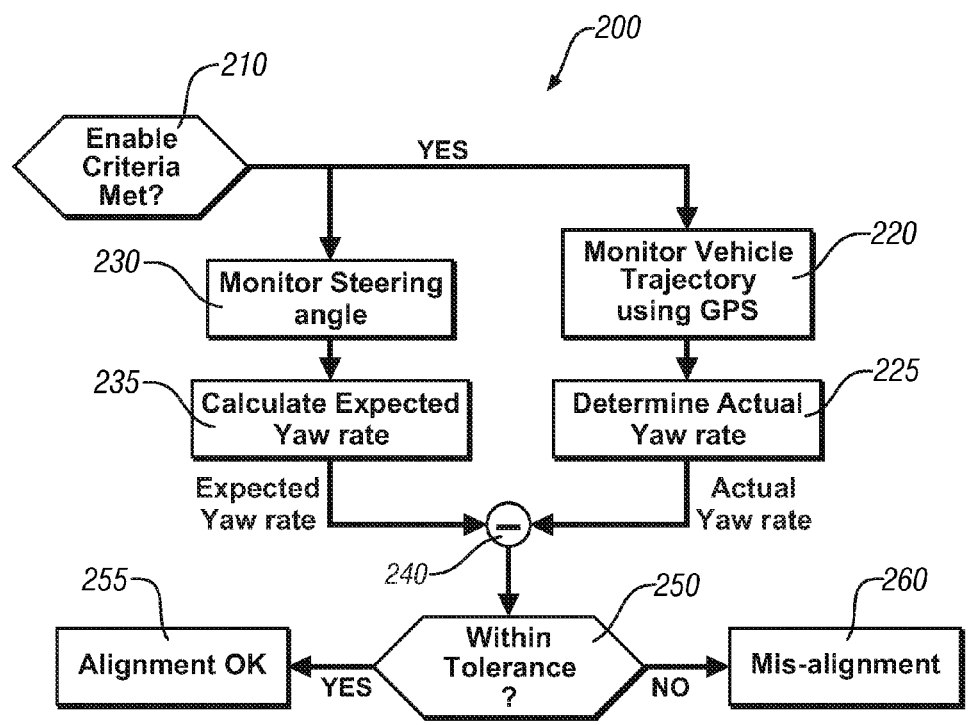

Another method to analyze the alignment of the wheels of the vehicle is based upon analyzing a vehicle in normal, stable travel and comparing a measured trajectory to an expected yaw rate. FIG. 3 shows a second flowchart (200) describing operations preferably executed in the control module 30 to monitor alignment of the wheels 60, 70 of the vehicle 10 during ongoing vehicle operation. Initially, specific enable criteria are monitored, and can include factors related to road surface smoothness, road curvatures and vehicle operating factors. The vehicle operating factors indicate whether there is presently stable vehicle operation. The vehicle operating factors preferably include a linear tire dynamics range, moderate or no lateral vehicle acceleration, moderate or no commanded steering angle, no wheel spin of the driven wheels, no active braking commands, and no presently active chassis stability compensation. Preferably, tire pressures and wheel radii are known with certain tolerances, e.g., using a tire pressure monitoring system.

The wheel alignment is monitored after the enable criteria are met or achieved (210). The travel path of the vehicle 10 is monitored and the actual vehicle trajectory including vehicle speed and direction of travel is determined using the GPS 50 as previously described (220). The commanded steering angle is monitored using the steering wheel angle sensor 40 and the vehicle speed is monitored using the vehicle speed sensor 25 (230). An expected yaw rate can be calculated based upon the commanded steering angle and operating conditions of the vehicle 10, including vehicle speed, according to methods described herein (235). An actual yaw rate is determined based upon the actual trajectory of the vehicle determined using the GPS 50 (225).

It will be appreciated that, once corrected according to the GPS signal, as described in exemplary step 170 above, the signal output from the yaw rate sensor 15 can be used as a reliable source of information regarding the actual trajectory of the vehicle. The signal output from the yaw rate sensor 15 can be used in conjunction with the GPS signal to perform the actual trajectory or actual yaw rate determination, for example, filling in values between the GPS signals determined, for example, at an exemplary slow sample rate of 1 Hz, or the signal from the yaw rate sensor 15 can alternatively be used, once corrected, to be the sole basis for the actual trajectory or yaw rate determination. Correction of the signal output from the yaw rate sensor 15 can be performed continually as permitted by enabling criteria, or the correction can occur periodically depending upon a determined rate at which the signal output from the yaw rate sensor becomes unacceptably inaccurate according to methods and criteria known in the art. If the signal output from the yaw rate sensor 15 has not been corrected in more than a threshold time, use of the signal output to determine the actual trajectory can be disabled based upon unacceptable accuracy in the signal output.

Returning to FIG. 3, the expected yaw rate and the actual yaw rate are compared (240) to determine whether the expected yaw rate and the actual yaw rate are within an allowable tolerance level (250). When it is determined that the expected yaw rate and the actual yaw rate are within the allowable tolerance level, the wheel alignment is determined to be acceptable (255). Misalignment of the steerable wheels 60 is identified when the expected yaw rate differs from the actual yaw rate by an amount greater than the allowable tolerance level (260).

The expected yaw rate can be calculated based upon the commanded steering angle and operating conditions of the vehicle 10 (235), using the following equation:

$$\begin{bmatrix} \dot{\beta} \\ \dot{r} \end{bmatrix} = \begin{bmatrix} \frac{-C_0}{mV} & -1 + \frac{-C_1}{mV^2} \\ \frac{C_1}{I_z} & \frac{-C_2}{I_z V} \end{bmatrix} \begin{bmatrix} \beta \\ r \end{bmatrix} + \begin{bmatrix} \frac{C_f}{mV} \\ \frac{C_f a}{I_z} \end{bmatrix} \delta \quad [1]$$

wherein:
  $\beta$=slip angle of the vehicle 10;
  $\dot{\beta}$=time differentiation of the slip angle;
  r=the expected yaw rate;
  $\dot{r}$=yaw acceleration, i.e., a time differentiation of the yaw rate;
  $\delta$=angle of the steerable wheels 60, measured using the steering wheel angle sensor 40, which can be divided by a vehicle model-specific constant factor (e.g. 17.5);
  m=mass of the vehicle 10;
  Iz=moment of inertia around a vertical axis at a center point of the vehicle 10, which is a constant for a given vehicle; and
  V=vehicle speed, as measured using the vehicle speed sensor 25.

Coefficients C0, C1 and C2 are calculated as follows:

$C0 = Cf + Cr$ [2]

$C1 = Cr*b - Cf*a$ [3]

$C2 = Cf*a2 + Cr*b2$ [4]

wherein a and b are distances from a center of gravity of the vehicle 10 to the front and rear axles respectively, i.e., to the front and rear wheels 60 and 70, and $C_f$ and $C_r$ are front and rear cornering stiffness factors, respectively, which are constant states in one embodiment.

By way of an exemplary determination, utilizing a corrected signal output from the yaw rate sensor 15 to determine an actual yaw rate, a vehicle having a steering wheel angle sensor 40 with a steering angle sensor error of +/−0.1 deg, and operating at a vehicle speed between 20 and 30 m/s with a speed measurement error of +/−0.1 m/sec has an error in expected yaw rate of +/−0.2 to 0.3 deg/sec based upon execution of Eq. 1 using standard error analysis. The signal output from the yaw rate sensor 15 has an error of +/−0.1 deg/sec. The expected and measured yaw rates have errors of comparable magnitude. Thus, misalignment of the vehicle wheels 60 can be identified when the expected yaw rate differs from the actual yaw rate by an amount greater than the allowable tolerance level, which can be +/−0.2 to 0.3 deg/sec in one embodiment (260). The misalignment of the vehicle wheels 60 that is identified when the expected yaw rate differs from the actual yaw rate by an amount greater than the allowable tolerance level includes wheel toe-in or toe-out.

As described above, indication of misalignment of the wheels of the vehicle can be based upon comparing an actual trajectory and an expected trajectory and applying a threshold indication to the comparison. It will be appreciated that other methods are known for indicating a condition based upon comparison. For example, a number of statistical methods known in the art can be applied to the comparison, for example, indicating misalignment of the wheels based upon analysis of standard deviation of comparison over a period. A number of methods to compare the actual trajectory and expected trajectory of the vehicle are envisioned, and the disclosure is not intended to be limited to the particular exemplary embodiments disclosed herein.

Indicating misalignment or alignment can take many forms known in the art. A visible indication can be displayed in the form of a warning light, a textual message, or a graphic display. Such a display can be within an instrumentation cluster in an instrument panel of the vehicle. Alternatively, such an indication can be displayed upon a video screen within the vehicle. Alternatively, an audible message can be relayed to the operator of the vehicle, for example, alerting misalignment when it is first detected or confirming correct alignment, for example, every tenth time the vehicle is started. In the alternative, a message can be communicated over a remote network, for example, describing the indication to the operator over the internet or alerting a vehicle fleet manager to the indication. In the alternative, the indication can be stored in a memory device within the vehicle for access by a repair technician the next time the vehicle is checked for service. A number of embodiments for indicating an alignment condition of the wheels of a vehicle are envisioned, and the disclosure is not intended to be limited to the exemplary embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to monitor alignment of wheels of a vehicle through analysis of a GPS signal, the method comprising:
monitoring the GPS signal;
employing a processor to determine an actual trajectory of the vehicle based upon the GPS signal;
monitoring a vehicle sensor indicating an expected change in vehicle heading;
determining an expected trajectory of the vehicle based upon the vehicle sensor; and
indicating misalignment of the wheels of the vehicle based upon a comparison of the trajectories.

2. The method of claim 1:
wherein the determining the actual trajectory of the vehicle comprises determining an actual yaw rate of the vehicle based upon the GPS signal;
wherein determining the expected trajectory of the vehicle comprises monitoring a sensor indicating an expected yaw rate of the vehicle; and
wherein the indicating misalignment of the wheels of the vehicle based upon comparison of the trajectories comprises:
comparing the actual yaw rate to the expected yaw rate; and
indicating misalignment of the wheels when a difference between the expected yaw rate and the actual yaw rate is greater than a threshold.

3. The method of claim 2, further comprising indicating an acceptable alignment of the wheels of the vehicle when the difference between the expected yaw rate and the actual yaw rate is less than the threshold.

4. The method of claim 2:
wherein the monitoring the sensor indicating the expected yaw rate of the vehicle comprises:
monitoring a steering angle;
monitoring a vehicle speed; and
determining an expected yaw rate based upon the steering angle and the vehicle speed; and
wherein determining the actual yaw rate of the vehicle comprises:
iteratively monitoring a vehicle heading based upon the GPS signal; and
determining the actual yaw rate corresponding to the vehicle heading.

5. The method of claim 2:
wherein monitoring the sensor indicating the expected yaw rate of the vehicle comprises:
monitoring a steering angle;
monitoring a vehicle speed; and
determining an expected yaw rate based upon the steering angle and the vehicle speed; and
wherein determining the actual yaw rate of the vehicle comprises:
correcting a signal output from a yaw rate sensor based upon the GPS signal; and
utilizing the corrected signal output from the yaw rate sensor as the actual yaw rate.

6. The method of claim 1, further comprising:
monitoring vehicle operating factors selected to indicate whether vehicle operation is presently stable; and
enabling the method based upon the monitored vehicle operating factors.

7. The method of claim 1, wherein determining the actual trajectory of the vehicle based upon the GPS signal comprises:
correcting a signal output from a yaw rate sensor based upon the GPS signal; and
utilizing the corrected signal output from the yaw rate sensor to determine the actual trajectory of the vehicle.

8. The method of claim 7, wherein correcting the signal output from the yaw rate sensor comprises:
iteratively monitoring a vehicle heading based upon the GPS signal;
determining an actual yaw rate corresponding to the vehicle heading;
comparing the signal output from the yaw rate sensor to the actual yaw rate; and
conditioning the signal output from the yaw rate sensor based upon the comparing.

9. The method of claim 1, wherein the determining the actual trajectory of the vehicle based upon the GPS signal comprises:
correcting a signal output from a yaw rate sensor based upon the GPS signal; and
utilizing the corrected signal output from the yaw rate sensor and the GPS signal to determine the actual trajectory of the vehicle.

10. The method of claim 1, further comprising comparing the actual trajectory to a straight forward trajectory, wherein the comparison of the trajectories is performed only when the comparing the actual trajectory to the straight forward trajectory indicates the vehicle to be in a threshold straight forward trajectory.

11. The method of claim 10, wherein indicating misalignment of the wheels of the vehicle based upon the comparison of the trajectories comprises:
comparing the expected trajectory of the vehicle to the straight forward trajectory; and
indicating misalignment of wheels based upon the expected trajectory of the vehicle differing from the straight forward trajectory by more than a threshold.

12. The method of claim 11, further comprising indicating an acceptable alignment of the wheels of the vehicle when the difference between the expected trajectory of the vehicle and the straight forward trajectory is less than the threshold.

13. The method of claim 1, wherein indicating misalignment of the wheels of the vehicle based upon the comparison of the trajectories comprises utilizing statistical analysis to compare the trajectories.

14. Method to monitor alignment of wheels of a vehicle through analysis of a GPS signal, the method comprising:
monitoring the GPS signal;
periodically correcting a signal output from a yaw rate sensor based upon the GPS signal;
employing a processor to determine an actual yaw rate of the vehicle based upon the corrected signal output from the yaw rate sensor;
monitoring a vehicle sensor indicating an expected change in vehicle heading;
determining an expected yaw rate of the vehicle based upon the vehicle sensor indicating the expected change in vehicle heading;
comparing the expected yaw rate and the actual yaw rate; and
indicating misalignment of the wheels of the vehicle based upon the comparing.

15. Apparatus to monitor alignment of wheels of a vehicle through analysis of a GPS signal, the apparatus comprising:
a steering wheel angle sensor;
a vehicle speed sensor;
a GPS device;
a control module:
monitoring a GPS signal from the GPS device;
determining an actual trajectory of the vehicle based upon the GPS signal;
monitoring the steering wheel angle sensor;
monitoring the vehicle speed sensor;
determining an expected trajectory of the vehicle based upon the steering wheel angle sensor and the vehicle speed sensor; and
indicating misalignment of the wheels of the vehicle based upon comparison of the trajectories.

16. The apparatus of claim 15, further comprising:
a yaw rate sensor; and
wherein determining the actual trajectory of the vehicle based upon the GPS signal comprises:
correcting a signal output of the yaw rate sensor based upon the GPS signal; and
utilizing the signal output of the yaw rate sensor to determine the actual trajectory.

17. The apparatus of claim 15, wherein the comparison of the trajectories comprises determining if the expected trajectory differs from the actual trajectory by more than a threshold.

18. The apparatus of claim 15, wherein determining the actual trajectory of the vehicle based upon the GPS signal comprises determining an actual yaw rate;
wherein determining the expected trajectory of the vehicle based upon the steering wheel angle sensor and the vehicle speed sensor comprises determining an expected yaw rate; and
wherein indicating misalignment of the wheels of the vehicle based upon comparison of the trajectories comprises:
comparing the actual yaw rate and the expected yaw rate; and
indicating misalignment of the wheels based upon the comparing.

* * * * *